United States Patent [19]

Stewart et al.

[11] Patent Number: 4,892,391

[45] Date of Patent: Jan. 9, 1990

[54] METHOD OF ARRANGING THE CELLS WITHIN THE PIXELS OF A COLOR ALPHA-NUMERIC DISPLAY DEVICE

[75] Inventors: Wilber C. Stewart, Highstown; Albert P. Pica, East Windsor; William R. Roach, Rocky Hill, all of N.J.

[73] Assignee: General Electric Company, Princeton, N.J.

[21] Appl. No.: 303,997

[22] Filed: Jan. 30, 1989

Related U.S. Application Data

[63] Continuation of Ser. No. 156,061, Feb. 16, 1988, abandoned.

[51] Int. Cl.$^4$ ........................ G02F 1/133; G09G 1/28; H04N 3/12

[52] U.S. Cl. ................................ 350/339 F; 340/701; 340/702; 340/703; 358/240

[58] Field of Search .................... 350/339 F; 340/701, 340/702, 703; 358/56, 71, 240

[56] References Cited

U.S. PATENT DOCUMENTS

| | | | |
|---|---|---|---|
| 4,006,968 | 2/1977 | Ernstoff et al. | 350/160 |
| 4,246,601 | 1/1981 | Sato et al. | 358/47 |
| 4,479,143 | 10/1984 | Watanabe et al. | 358/44 |
| 4,491,863 | 1/1985 | Kurahashi | 358/56 |
| 4,553,159 | 11/1985 | Moraillon | 358/44 |
| 4,688,031 | 8/1987 | Haggerty | 340/703 |
| 4,716,403 | 12/1987 | Morozumi | 350/339 F |
| 4,800,375 | 1/1989 | Silverstein et al. | 340/703 |

FOREIGN PATENT DOCUMENTS

| | | | |
|---|---|---|---|
| 0061724 | 4/1985 | Japan | 350/339 F |

OTHER PUBLICATIONS

A Method of Color Image Display, H. Hara, Y. Yoda, K. Owaki published in Japan Display 1983, pp. 26 to 29.

*Primary Examiner*—Stanley D. Miller
*Assistant Examiner*—Anita Pellman Gross
*Attorney, Agent, or Firm*—J. S. Tripoli; D. H. Irlbeck; L. L. Hallacher

[57] ABSTRACT

An improved method of arrangement for the cells comprising the pixels of a display device wherein each of the pixels includes a brightest cell, a bright cell, a medium cell and a dark cell. The brightest cell and the bright cell are aligned substantially parallel to one the display axes and the bright cell and the dark cell are diagonally aligned with respect to the axes of the dipslay.

4 Claims, 2 Drawing Sheets

Fig.2a Fig.2b Fig.2c Fig.2d
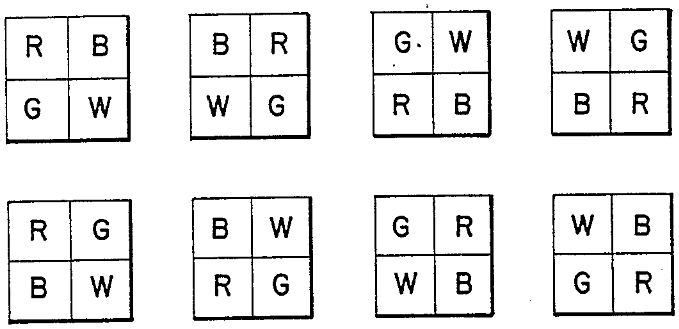
Fig.2e Fig.2f Fig.2g Fig.2h
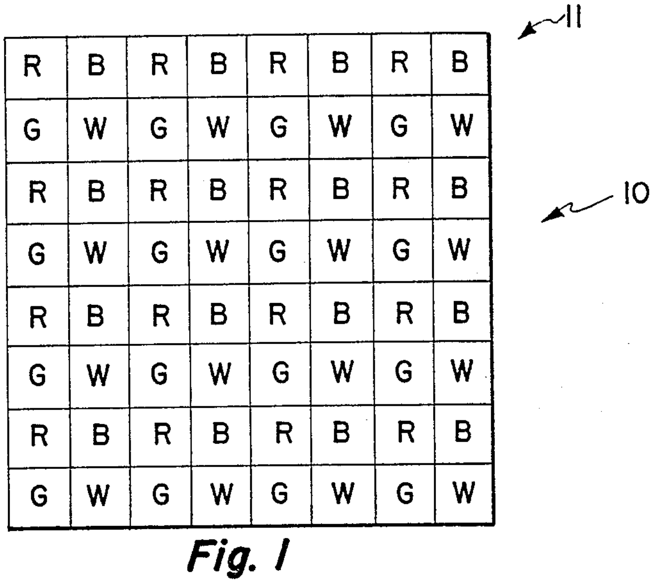
Fig. 1

METHOD OF ARRANGING THE CELLS WITHIN THE PIXELS OF A COLOR ALPHA-NUMERIC DISPLAY DEVICE

This is a continuation of application Ser. No. 156,061 filed Feb. 16, 1988, now abandoned.

BACKGROUND

This invention relates generally to color display devices and particularly to an arrangement for the cells within the pixels of a color alpha-numeric and graphic display device.

In color display devices each pixel of the display includes cells which individually emit the red, green and blue primary colors of light. The pixels are arranged in rows substantially parallel to a horizontal axis and in columns substantially parallel to a vertical axis. For alpha-numeric and graphic display devices, the pixels are comprised of bilevel cells whereby actuated cells provide light and unactuated cells provide no light. The desired alpha-numeric and graphic displays are produced by selectively actuating the cells required to produce the desired display. Displays having one of the three primary colors are produced simply by actuating the desired color cells within the pixels needed to produce the desired pattern. For example, when a green display is desired, the green cells within the pixels needed to produce the desired pattern are actuated, while the other cells within the pixels remain unactuated. White is produced by simultaneously actuating all three color cells within each pixel, and black, or nearly black is produced when none of the cells within a pixel are actuated. Other colors are produced by simultaneously actuating the cells required to produce such color. For example, magenta is produced by simultaneously actuating the red and blue cells.

Alpha-numeric and graphic display devices require horizontal, vertical and diagonal straight lines. Accordingly, the pixels are arranged horizontally and vertically in rows and columns in an effort to produce such lines. However, when each pixel is composed of three cells, the cells are typically arranged in a triangular pattern and all three cells cannot be vertically or horizontally aligned and straight lines can not be produced. It has been found that the appearance of alpha-numeric and graphic displays can be improved by adding a fourth cell to each pixel to provide diagonal symmetry to the pixels. However, problems nevertheless arise because the color of the additional cell upsets the color balance of the pixel. Additionally, all four cells within a pixel can not be horizontally or vertically aligned and therefore the production of some colors of displays requires the selection of unaligned cells within the pixels and straight lines extending in all directions can not be produced. Because of these difficulties, there is a need for an arrangement of the cells within the pixels which yields alpha-numeric characters, and line segments which are the easiest to read and which are the most pleasing to a viewer situated at the normal viewing distance. An acceptable alpha-numeric display device must meet several criteria for the straight and diagonal line segments which form the characters and graphic portions of the display. When viewed from the standard viewing distance, upwardly and downwardly sloping diagonal lines should have the same general overall appearance. Also, horizontal and vertical lines should appear straight. These criteria must be met for all colors of alpha-numeric displays. The present invention is directed to arrangements of the cells within the pixels of a display device which meet these criteria.

SUMMARY

A display device having an array of multi-cell pixels arranged along horizontal and vertical axes includes an improved arrangement for the cells comprising the pixels wherein each of the pixels includes a brightest cell, a bright cell, a medium cell and a dark cell. The brightest cell and the bright cell are aligned substantially parallel to one of the axes. The bright cell and the dark cell are diagonally aligned with respect to the axes.

DESCRIPTION OF THE DRAWINGS

FIG. 1 is a preferred embodiment.

FIGS. 2*a* through 2*h* show various arrangements of cells within the pixels of a display device which are consistent with the invention.

DETAILED DESCRIPTION

Figure 3:
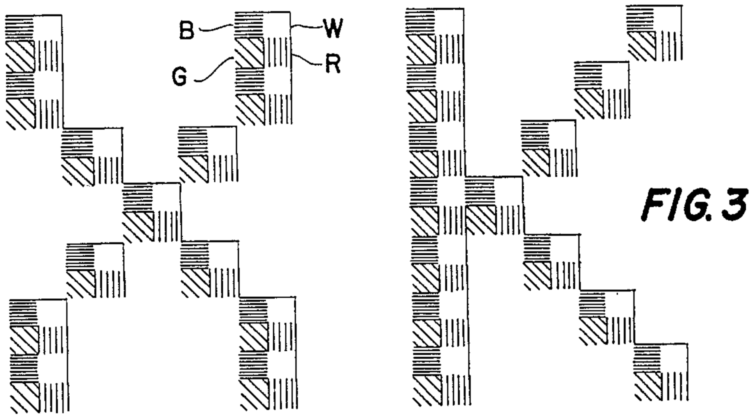
FIG. 3 shows the undesirable appearance of the letters X and K resulting from a cell arrangement different from those of the present invention.

FIG. 1 shows a portion of a display device 10 incorporating the invention. The display device 10 includes a plurality of pixels 11 which are arranged horizontally in rows and vertically in columns. Each of the pixels 11 includes four cells individually identified as R, G, B and W, which identify the color transmitted by the individual cells. Thus, the R cell transmits red light, the B cell blue light, the G cell green light and the W cell white light. The R,G, B, W cells are arranged in a repetitive pattern in accordance with their luminosities. Accordingly, the white cells are the brightest, the green cells bright, the red cells medium and the blue cells dark. The red and blue cells are arranged in an alternating repetitive pattern to form the first (top) row of the display. The green and white cells are arranged in an alternating repetitive pattern to form the second row of the display. Accordingly, the first (left) column of the display device contains alternate red and green cells, and the second column contains alternate blue and white cells. The bright (G) and dark (B) cells are diagonally aligned, as are the brightest (W) and medium (R). This pattern is repeated across the entire surface of the display device 10. This arrangement of the cells within the pixels 11 creates the advantages of all diagonally sloping lines having a very similar appearance and of all horizontal and vertical lines being straight line segments for all graphic or alpha-numeric displays.

FIGS. 2*a* through 2*h* show cell arrangements which are consistent with the above criteria for optimum alpha-numeric displays. In FIG. 2*a* the four R, B, G, W cells are arranged as shown in FIG. 1 with the green and white cells horizontally adjacent and the green and blue cells diagonally aligned. FIG. 2*b* is similar to FIG. 2*a* in that the green and white cells are aligned in the second horizontal row. However, the white and blue cells are in the first column rather than the second, as in FIG. 2*a*. FIG. 2*c* shows the bright (green) and brightest (white) cells horizontally aligned in the top row and the medium (red) and dark (blue) cells aligned in the second row. FIG. 2*d* is similar to FIG. 2*c* except that the white and blue cells are in the first column, rather than the second column.

FIGS. 2*e* to 2*h* show the cell arrangements when the display 10 of FIG. 1 is rotated 90°. In FIG. 2*e* the brightest (W) and bright (G) cells are vertically aligned in the right column and the bright (G) and dark (B) cells again are diagonally aligned. FIG. 2*f* is similar to FIG. 2*e* but the B and W cells are in the top row, rather than the bottom row as they are in FIG. 2*e*. FIG. 2*g* has the G and W cells vertically aligned with the W cell in the second row. FIG. 2*h* is similar to FIG. 2*g* but the W cell is in the top row and the G cell is in the second row. In all the cell arrangements of FIGS. 2*a* through 2*h* the brightest (W) cells and the bright (G) cells are either horizontally or vertically aligned while the bright (G) and dark (B) cells are diagonally aligned.

There are several advantages to the cell arrangements shown in FIGS. 2*a* through 2*h*. First, when white is to be displayed all four cells are actuated and a very pure white display is obtained because of the white contribution of the white cell. Additionally, all upwardly sloping and downwardly sloping diagonal lines which are portions of alpha-numeric or graphic displays are similar in appearance. Also, all horizontal and vertical lines are straight and void of any staggering of the brightest and bright cells.

The advantages of the arrangement shown in FIGS. 2*a* through 2*h* can be appreciated from FIG. 3, which does not include any of the inventive cell arrangements. In FIG. 3, the green and white cells are diagonally arranged, as are the red and blue cells. Accordingly, the vertical lines, such as the small portions of the letter X and the vertical of the letter K, are staggered because of the diagonal alignment of the brightest and the bright cells. Also, the diagonals which slope downwardly from the left to the right have an appearance which is substantially different from that of the diagonals which slope upwardly from the left to the right. Accordingly, the diagonal disposition of the brightest (W) cells and the bright (G) cells is disadvantageous because it causes jagged appearing vertical and horizontal lines and dissimilar diagonal lines.

Figure 4:
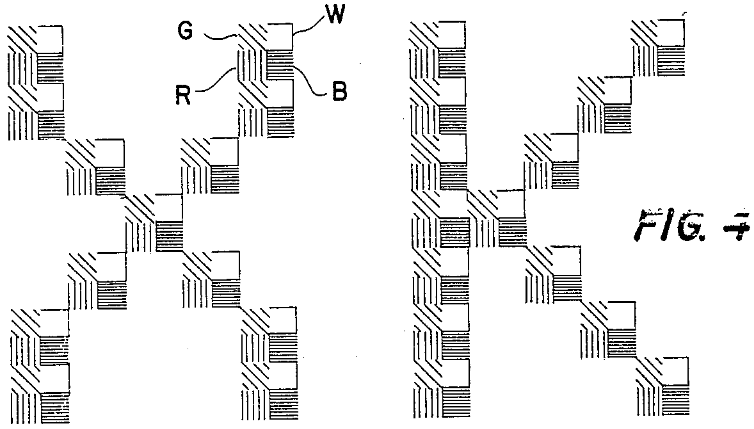
FIG. 4 shows the desirable appearance of the letters X and K when a first arrangement of pixel cells consistent with the claimed invention is utilized.

FIG. 4 shows the same letters X and K as FIG. 3 with the brightest (W) and bright (G) cells horizontally aligned in the top row of pixels and with the medium (R) and dark (B) cells horizontally aligned in the second row of pixels. Accordingly, the FIG. 4 illustration could include the cell arrangement shown in either FIG. 2*c* or FIG. 2*d*. The alpha-numeric characters shown in FIG. 4 have uniform diagonals sloping in both directions and also straight vertical and horizontal lines and, thus, are more pleasant to the eye and easier to read than the characters of FIG. 3. The same pleasing appearance is achieved when the arrangements of FIGS. 2*a* and 2*b* are used with the brightest and bright cells in the second horizontal row of pixels.

Figure 5:
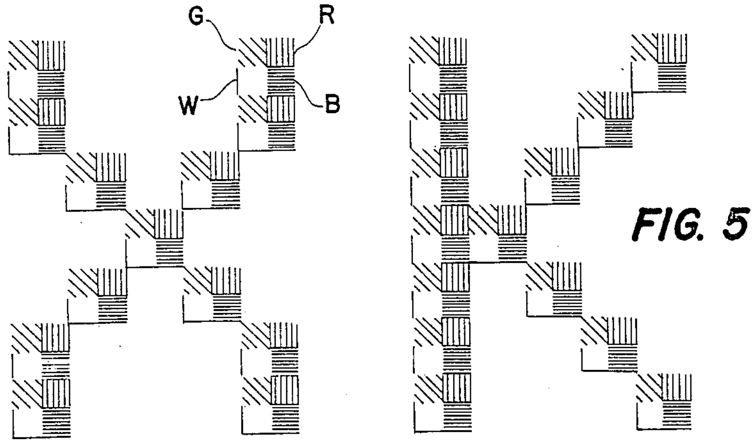
FIG. 5 shows the desirable appearance of the letters X and K when another arrangement of cells consistent with the claimed invention is utilized.

FIG. 5 shows the appearance of the same letters X and K when the cell arrangements shown in FIGS. 2*g* and 2*h* are used. The vertical alignment of the brightest and bright cells results in straight and pleasing vertical lines. Additionally, the upwardly sloping diagonals have the same appearance as the downwardly sloping diagonals, resulting in a pleasing appearance and easily read characters. The pleasing, easily read appearance of the characters in FIG. 5 is also realized with the cell arrangements shown in FIG. 2*e* and 2*f*, the only difference being that the bright portions of the characters lie on the right of each stroke, rather than on the left as they do in FIG. 5.

The cell arrangements illustrated in FIG. 1 and FIGS. 2*a* through 2*h* are particularly advantageous when alpha-numeric and graphic displays are to be produced utilizing bilevel devices. With bilevel devices the individual cells are either on or off and no attempt is made to obtain gray scale gradations. Accordingly, the R, B, G, W cells used with the invention typically are intended to be bilevel devices, and preferably are liquid crystal cells. The construction of liquid crystal cells, and the manner of attaining colors from such cells, is well known to those skilled in the art and the details thereof need not be described herein.

What is claimed is:

1. A method for producing straight vertical and horizontal alpha-numeric lines and for producing upwardly and downwardly sloping alpha-numeric lines having the same overall appearance in a display device having an array of multi-cell pixels arranged along horizontal and vertical axes, wherein each of said pixels includes a white cell, a green cell, a red cell and a blue cell comprising the steps of:

arranging said white cell and said green cell substantially parallel to one of said axes; and aligning said green cell and said blue cell diagonally with respect to the other of said axes.

2. The method of claim 1 further including the step of operating said cells as bilevel devices.

3. A method for producing straight vertical and horizontal alpha-numeric lines and for producing upwardly and downwardly sloping alpha-numeric lines having the same overall appearance in a display device having an array of multi-cell liquid crystal pixels arranged along horizontal and vertical axes, wherein each of said pixels includes a white cell, a green cell, a red cell and a blue cell comprising the steps of:

arranging said white cell and said green cell substantially parallel to one of said axes; and aligning said green cell and said blue cell diagonally with respect to the other of said axes.

4. The method of claim 3 further including the step of operating said cells as bilevel devices.

* * * * *